Figure 1:
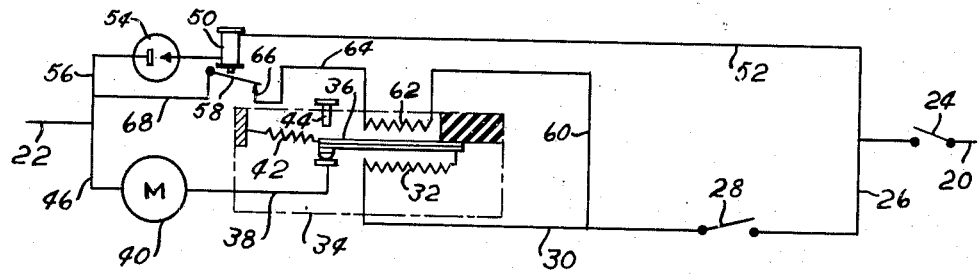

Oct. 4, 1949.  D. F. ALEXANDER  2,483,515
LOW-VOLTAGE PROTECTIVE ARRANGEMENT
Filed July 9, 1945

INVENTOR.
Donald F. Alexander
BY
Spencer Hardman and Fehr
Attorneys

Patented Oct. 4, 1949

2,483,515

UNITED STATES PATENT OFFICE 2,483,515

LOW-VOLTAGE PROTECTIVE ARRANGEMENT

Donald F. Alexander, Oakwood, Ohio, assignor to General Motors Corporation, Dayton, Ohio, a corporation of Delaware Application July 9, 1945, Serial No. 603,795

1 Claim. (Cl. 175—294)

This invention relates to electrical apparatus and more particularly to low-voltage protectors.

In the past the switching devices controlled by low-voltage protectors ordinarily have been required to carry the full current to be supplied to the circuit or device to be protected. This made such relays expensive and contributed a certain amount of inaccuracy. Also, occasionally during starting efforts a momentary drop in voltage may cause an unnecessary and undesirable opening or fluttering of the low-voltage protector contacts.

It is an object of my invention to provide a less expensive and more adequate low-voltage protector for electrical circuits and devices.

It is another object of my invention to provide a low-voltage protector which will not cause opening of the main circuit upon momentary drops in voltage.

These objects are attained by employing a sensitive low capacity, low-voltage protector relay to bias the usual circuit overload protector sufficiently to cause it to operate under low voltage conditions.

Further objects and advantages of the present invention will be apparent from the following description, reference being had to the accompanying drawing, wherein a preferred form of the present invention is clearly shown.

Figure 2:
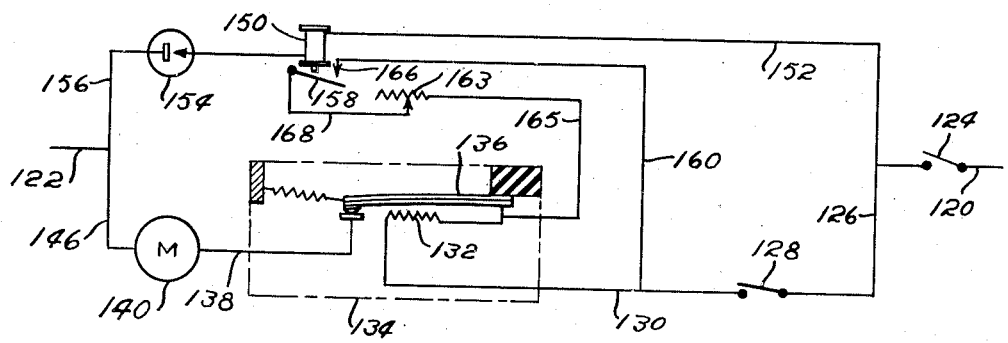

In the drawings:

Fig. 1 is a wiring diagram illustrating an electrical circuit for an electric motor provided with one form of my improved low-voltage protector; and Fig. 2 is a wiring diagram of an electric motor circuit provided with another form of my improved low-voltage protector.

Referring now more particularly to Fig. 1, there is shown a motor circuit including the supply conductors 20 and 22. The supply conductor 20 connects to a switch 24 which controls the flow of current to the entire circuit. This switch 24 connects to a conductor 26 connecting to a second switch 28 which in turn connects to the conductor 30. The conductor 30 connects to the heating element 32 of the overload protector 34. This heating element 32 is adapted to heat the bimetal thermal overload element 36. This element 36 carries at its end a movable contact adapted to make contact with the stationary contact at the end of the conductor 38 which connects to the motor 40. The bimetal element 36 is preferably provided with a toggle snap-acting spring 42 for regulating the tripping point at which the overload trips to the open circuit position. An adjustable stop 44 is provided which sets the reclosing temperature of the thermal overload 44. The motor 40 is connected by the conductor 46 to the other supply conductor 22.

To prevent the operation of the motor under low-voltage conditions, I provide a normally closed low-voltage pilot type relay 50 connected by the conductor 52 to the switch 24 and connected through the rectifier 54 and the conductor 56 to the supply conductor 22. The rectifier 54 should be omitted when the protector is used for direct current circuits. However, it is desirable although not absolutely necessary for alternating current circuits, since it considerably improves the accuracy of the low-voltage relay 50. The low-voltage relay 50 is provided with the normally closed contact mechanism 58 which, when the voltage is low, closes the heating circuit for the overload protector 34. This heating circuit includes the conductor 60 which extends from the conductor 30 to the auxiliary heater 62 which in turn is connected by the conductor 64 to the stationary contact 66 of the low-voltage relay 50. The movable contact 58 is connected by the conductor 68 to the conductor 56 which connects to the supply conductor 22.

Under normal operating conditions when the switches 24 and 28 are closed, the current flowing through the low-voltage relay 50 will keep its movable contact 58 in the upper open position so that the heater 62 will be deenergized. Current also will flow through the overload protector 34 and the motor 40 in the usual manner. Upon any overload, the overload will function to protect the motor and motor circuit. However, should the voltage drop to the point where the current flowing through the low-voltage relay 50 can no longer hold the contact 58 in the open position, the contact 58 will be released to the closed position shown in Fig. 1, thereby energizing the heater 62. This energization will heat the bimetal element 36 sufficiently to cause it to move to the open circuit position thereby deenergizing the motor 40. As long as the low-voltage continues, the heater 62 will continue to heat the bimetal element 36 to prevent the energization of the motor 40. However, as soon as the voltage rises above the point at which the low-voltage relay 50 is set to open and close the heater 62 will be deenergized and the overload protector will return to its closed position thereby starting the motor while the switches 24 and 28 remain closed. However, momentary drops in voltage will not cause the operation of the overload protector, since heating for a definite period of time is required to cause its operation.

The heater 62 and its circuit may be made so that only a small current may be carried. In this way the contact mechanism 58 of low-voltage pilot type relay 50 may be made very light so that the relay 50 may be made small and more accurate. This type of relay can be set to close and open at substantially the same values with only a very small differential between opening and closing. Such pilot type relays are more accurate and less expensive than the power type relays often used. The accuracy of the relay on alternating currents is made substantially equal to its accuracy on direct current by the use of the rectifier 54. It would be almost prohibitively expensive to use a rectifier with a power type relay.

In Fig. 2 a system is provided in which the low-voltage relay 150 is normally open. The supply conductor 120 connects to the switch 124 which in turn connects to the conductor 126. The switch 128 connects the conductor 126 with the conductor 130 which connects to the heater element 132 of the thermal overload protector 134. The heater 132 is connected to the anchored end of the thermal overload bimetal 136 having a movable contact at its opposite end which is normally in contact with the stationary contact connected to the conductor 138. The motor 140 is connected to the conductor 138 and to the conductor 146 which connects to the other conductor 122. The low-voltage relay 150 is connected by the conductor 122 to the switch 124 and to the rectifier 154 which is connected by the conductor 156 to the other supply conductor 122.

For controlling the overload protector 134, there is provided a shunt circuit for the heater 132 which includes the conductor 160 which connects the stationary contact 166 to the conductor 130. The low-voltage relay 150 is provided with a normally open movable contact 158 connected by the conductor 168 to a variable resistance 163 which in turn is connected by the conductor 165 to the connection between the heater 132 and the anchored end of the bimetal element 136.

By this arrangement when the switches 124 and 128 are closed, normally sufficient current will flow through the low-voltage relay 150 to close and hold closed the contacts 158 and 166 to allow a predetermined part of the current to by-pass the heater 132 of the overload protector 134. The amount of by-passed or shunted current depends upon the setting of the variable resistance 163. All of the motor current, however, flows through the bimetal element 136 and the contacts of the protector 134.

Under low-voltage conditions the current flow through the relay 150 will be insufficient to hold the contact 158 closed so that the movable contact 158 will release to open the shunt circuit, thereby causing full motor current to flow through the heater 132. The heater 132 is provided with sufficient heating effect that when it is required to carry all of the current for the motor it will heat the bimetal element sufficiently to cause the opening of the contacts of the overload protector 134 to deenergize the motor 140. The shunt circuit controlled by the low-voltage relay carries only a small amount of current at low voltage and therefore the relay 150 may be made very accurate with a close differential. The rectifier 154 improves the accuracy of the relay upon alternating current but should not be used for direct current.

While the form of embodiment of the invention as herein disclosed, constitutes a preferred form, it is to be understood that other forms might be adopted, as may come within the scope of the claim which follows.

What is claimed is as follows:

An electrical circuit adapted to connect an electrical load to a power source including a thermal current overload protector having a thermal motor actuating element for disconnecting the load from the power source, said overload protector being provided in said circuit between the load and the power source, said circuit including an electrical heating device connected in series circuit arrangement with the overload protector for operating said thermal motor actuating element upon a current overload, said circuit including a voltage responsive circuit portion continuously connected in parallel circuit arrangement with said load, a low voltage electromagnetic relay having its operating coil continuously connected in series with said voltage responsive circuit portion, a second circuit portion having a second electrical heating device for heating and thereby operating said thermal motor actuating element, said relay having a normally closed switch contact mechanism connected in series with said second heating device for connecting said second circuit portion to said power source to energize said second heating device.

DONALD F. ALEXANDER.

REFERENCES CITED

The following references are of record in the file of this patent:

UNITED STATES PATENTS

| Number | Name | Date |
| --- | --- | --- |
| 1,210,058 | Fortescue | Dec. 26, 1916 |
| 1,513,247 | James | Oct. 28, 1924 |
| 1,655,967 | Matthews | Jan. 10, 1929 |
| 1,783,520 | Pearce | Dec. 2, 1930 |
| 1,830,578 | Vaughn | Nov. 3, 1931 |
| 2,001,542 | Owens | May 14, 1935 |
| 2,189,591 | McShane | Feb. 6, 1940 |
| 2,306,810 | Jones | Dec. 29, 1942 |

FOREIGN PATENTS

| Number | Country | Date |
| --- | --- | --- |
| 314,370 | Germany | Sept. 10, 1919 |
| 684,638 | Germany | Dec. 2, 1939 |